United States Patent
Lu

(10) Patent No.: US 11,488,314 B2
(45) Date of Patent: Nov. 1, 2022

(54) METHOD FOR MEASURING HUMIDITY AND ELECTRONIC DEVICE USING SAME

(71) Applicant: Nanning FuLian FuGui Precision Industrial Co., Ltd., Nanning (CN)

(72) Inventor: Ju-Lan Lu, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 111 days.

(21) Appl. No.: 17/186,891

(22) Filed: Feb. 26, 2021

(65) Prior Publication Data
US 2022/0164962 A1 May 26, 2022

(30) Foreign Application Priority Data

Nov. 25, 2020 (CN) .......................... 202011340906.X

(51) Int. Cl.
*G06K 9/00* (2022.01)
*G06T 7/246* (2017.01)
*G06T 7/11* (2017.01)
*G06T 7/70* (2017.01)
*G06V 10/40* (2022.01)

(52) U.S. Cl.
CPC .............. *G06T 7/246* (2017.01); *G06T 7/11* (2017.01); *G06T 7/70* (2017.01); *G06V 10/40* (2022.01); *G06T 2207/20021* (2013.01)

(58) Field of Classification Search
CPC .................................................. G06V 10/40
See application file for complete search history.

(56) References Cited

U.S. PATENT DOCUMENTS

| | | | |
|---|---|---|---|
| 6,208,963 B1 * | 3/2001 | Martinez | G06N 3/04 704/E15.017 |
| 2014/0378170 A1 * | 12/2014 | Rudow | G01S 19/35 455/456.6 |
| 2019/0197710 A1 * | 6/2019 | Wang | G06T 7/97 |
| 2019/0340862 A1 * | 11/2019 | Liu | G07D 7/2008 |
| 2020/0143180 A1 * | 5/2020 | Burzo | G06K 9/6268 |
| 2020/0183411 A1 * | 6/2020 | Oba | B60W 50/14 |

FOREIGN PATENT DOCUMENTS

| | | |
|---|---|---|
| CN | 204287059 U | 4/2015 |
| CN | 107036968 B | 9/2019 |
| TW | 201014347 A | 4/2010 |

* cited by examiner

*Primary Examiner* — Hadi Akhavannik
(74) *Attorney, Agent, or Firm* — ScienBiziP, P.C.

(57) ABSTRACT

A method for measuring humidity at long range using simplified equipment includes creating a formula according to a relationship between multiple sets of known optical flow feature vectors and a known humidity. First and second images are obtained, wherein the first image and the second image are captured as being in the same range of capture. A plurality of feature points in the first image is obtained and an optical flow feature vector for each of the feature points according to apparent changes in position of each feature point according to the second image are calculated. The degree of current humidity according to the optical flow feature vectors and the formula is thus obtained.

10 Claims, 2 Drawing Sheets

100

METHOD FOR MEASURING HUMIDITY AND ELECTRONIC DEVICE USING SAME

FIELD

A method for measuring humidity in metrology.

BACKGROUND

Infrared sensing, taken remotely, is widely used in detecting humidity in a wide range of environments. Infrared bands of different thermal states are identified, to study the characteristics of the earth's materials to obtain the earth's surface temperature, for fire monitoring, drought monitoring, etc. However, because such sensors have high requirements for the use environment and acquisition conditions, they are not suitable for daily life. Therefore, a simple way for measuring humidity is needed.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
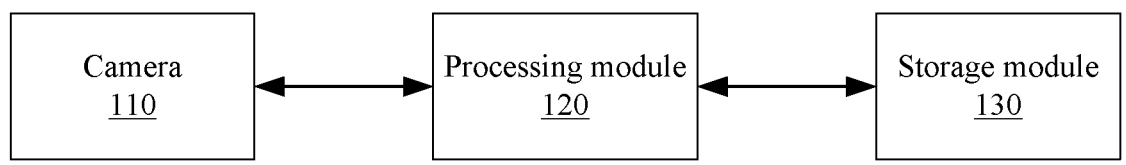
FIG. 1 is a block diagram of an electronic device in accordance with an embodiment.

FIG. 1 is a block diagram of an electronic device (electronic device 100) in accordance with an embodiment. The electronic device 100 at least includes a camera 110, a processing module 120, and a storage module 130. The camera 110 can be any device capable of capturing images, and is used to capture at least two images at the same range at a predetermined time. The processing module 120 connects to the camera 110, preprocesses images received from the camera 110, obtains multiple feature points in the processed images, tracks optical flow change of each feature point, and calculates degree of humidity based on the optical flow feature vectors of the feature points and formula. The processing module 220 can be, for example, dedicated hardware circuits or general-purpose hardware (e.g., a single processor, a multi-processor with parallel processing capabilities, a graphics processor, or other computing capabilities processor), and is able to provide the functions described below. The storage module 130 connects to the processing module 120, and can be a non-volatile storage device such as a hard disk, a flash drive, etc., and is used to store the algorithms and formulas for the foregoing process. Moreover, the formulas can be created in advance by the processing module 120. For example, the user can take multiple sets of at least two images with the same range of capture in an environment with different degrees of humidity, and create the formulas according to the relationship between the changes in the optical flow feature vectors of multiple feature points in at least two images and the known humidity. In this way, the processing module 120 may obtain the optical flow feature vectors of the multiple feature points of two continuous images in any environment, and calculate the degree of humidity based on the optical flow feature vector and the formulas. In addition, the electronic device 100 may further include a display module not shown in FIG. 1, which may be a display panel (such as a thin-film liquid crystal display panel, an organic light-emitting diode panel, or other panels with display capabilities) for displaying the results of calculation. Moreover, when the electronic device 100 is an augmented reality device, the degree of humidity can also be projected into the display scene. It should be noted that the foregoing descriptions about the camera 110, the processing module 120, and the storage module 130 are only examples, the disclosure not being limited thereto.

According to an embodiment, after the processing module 120 obtains at least two continuous images (i.e., the first image and the second image) with the same range of capture from the camera 110, each image is preprocessed, and feature points in the images are obtained. For example, the processing module 120 first performs gray-scale processing on the first image to convert it into a first gray-scale image, divides the first gray-scale image into multiple grids, and sets intersection points of each of the two grids as feature points. The user may averagely divide the image into multiple grids with the same size of area, or, when objects in the images (such as a large-scale landscape) may be distorted due to the use of a wide-angle lens, the processing module 120 may cut the image into multiple grids according to longitude and latitude, and then take the intersection points of each of the two grids as the feature points. To improve the calculation accuracy, user may adjust the number of grids according to the need. For example, the great number of the grids, the higher of the accuracy, as the number of feature points is increased.

After obtaining the feature points of the first image, similarly, the processing module 120 obtains a second gray-scale image corresponding to the second image, and searches among the pixels in the second gray-scale image for those with the same gray-scale value. Such search is within a predetermined range of coordinates corresponding to each feature point in the first gray-scale image, and the coordinates corresponding to the pixels as the coordinates of the feature point after displacement are used. Next, the processing module 120 calculates the change in coordinate of each feature point to obtain the optical flow feature vector, dividing the two-dimensional coordinate system into multiple sectors with the same size of area. The optical flow feature vectors of all feature points located in the same sector are added to obtain the total feature vector corresponding to each sector. Finally, the processing module 120 obtains the humidity corresponding to the first image and the second image according to the total of the feature vectors in the multiple sectors and by applying the formula.

According to another embodiment, when the user uses the electronic device 100 to obtain the first image and the second image, errors may occur due to hand shaking or trembling. Therefore, the processing module 120 may set a threshold for physical jitter in advance based on multiple sets of images. Thus when the optical flow feature vector of the feature points is less than the jitter threshold, it is determined as representing error, and the processing module 120 will not consider the optical flow feature vectors corresponding to the feature points, to avoid affecting the accuracy.

In addition, the processing module 120 may capture more than two continuous images to improve the accuracy of the calculated humidity. For example, the processing module 120 may capture four continuous images, and divide the four continuous images into 12 space-time units. Next, if the processing module 120 can divide the two-dimensional coordinate system into 8 sectors, thus the processing module 120 may obtain a feature vector of 96 dimensions (12*8). Finally, the processing module 120 calculates the current degree of humidity according to the total feature vector corresponding to each dimension and the formula.

Figure 2:
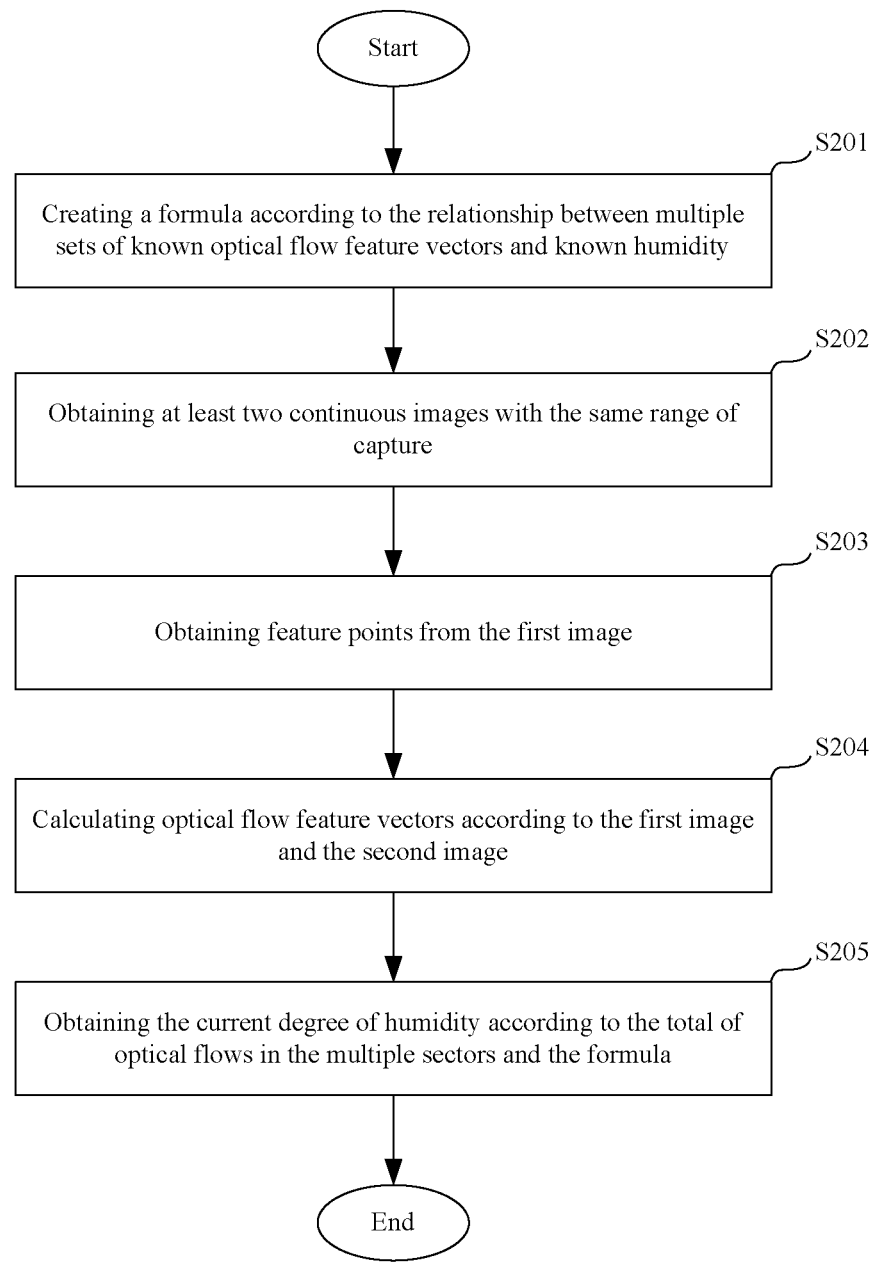
FIG. 2 is a flowchart of a method for measuring humidity in accordance with an embodiment.

FIG. 2 is a flowchart of a method for measuring humidity in accordance with an embodiment.

At step S201, the processing module 120 creates a formula according to the relationship between multiple sets of known optical flow feature vectors and known humidity, and stores the formula in the storage module 130.

At step S202, the camera 110 obtains at least two continuous images with the same range of capture.

At step S203, the processing module 120 preprocesses the first image, divides the processed first image into multiple grids, and takes the intersection of every two grids as the feature points.

At step S204, the processing module 120 preprocesses the second image, searches for pixels with the same gray-scale value in the second gray-scale image according to the coordinate corresponding to each feature point in the first gray-scale image, and calculates the optical flow feature vectors according to the coordinates of each feature point after determining the displacement.

At step S205, the processing module 120 divides the two-dimensional coordinate system into a plurality of sectors with the same size of area, adds up the optical flow feature vectors of all the feature points in each sector, and obtains the current degree of humidity according to the total of optical flows in the multiple sectors and the formula.

Although the method as described above has been described through a series of steps or blocks of a flowchart, the process is not limited to an order of the steps, and some steps may be in a different order or done at different times. In addition, those skilled in the art should understand that the steps shown in the flowchart are not exclusive, other steps may be included, or one or more steps may be deleted without departing from the scope of the claims.

In summary, according to the embodiments, by calculating the optical flow feature vectors of single feature points in two continuous images and the conversion formula calculated in advance, the humidity in the current environment can be calculated by simple equipment. Moreover, by increasing the number of feature points or the number of continuous images, the level of humidity can be calculated more accurately.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A method for measuring humidity, comprising the steps of:
    creating a formula according to a relative relationship between multiple sets of known optical flow feature vectors and known humidity;
    obtaining a first image through a camera, and obtaining a second image after a predetermined time, wherein the first image and the second image have the same range of capture;
    obtaining a plurality of feature points in the first image;
    calculating an optical flow feature vector for each feature points according to a position of each feature points in the second image; and
    obtaining a current humidity according to the optical flow feature vectors and the formula.

2. The method as claimed in claim 1, wherein the step of creating the formula according to the relative relationship between multiple sets of the known optical flow feature vectors and the known humidity further comprises:
    obtaining the formula through a least square method according the relative relationship.

3. The method as claimed in claim 1, wherein the step of obtaining the plurality of feature points in the first image further comprises:
    cutting the first image into multiple grids, and taking an intersection of every two grids as the plurality of feature points.

4. The method as claimed in claim 3, wherein the step of cutting the first image into multiple grids further comprises:
    cutting the first image into multiple grids according to radians corresponding to latitude and longitude.

5. The method as claimed in claim 1, wherein the step of obtaining the current humidity according to the optical flow feature vectors and the formula further comprises:
    deleting the optical flow feature vectors smaller than an jitter threshold;
    dividing a two-dimensional coordinate system into multiple sectors of same size of area; and
    adding up the optical flow feature vectors located in same sector to obtain a total feature vector corresponding to each sector, and obtaining the current humidity according to the total feature vector in a plurality of the sectors and the formula.

6. An electronic device, comprising:
    a camera, adapt for obtaining a first image and a second image after a predetermined time, wherein the first image and the second image have the same range of capture;
    a processing module, adapt for creating a formula according to a relative relationship between multiple sets of known optical flow feature vectors and known humidity, obtaining a plurality of feature points in the first image, calculating an optical flow feature vector for each feature points according to a position of each feature points in the second image, and obtaining a current humidity according to the optical flow feature vectors and the formula; and
    a storage module, adapt for storing the formula.

7. The electronic device as claimed in claim 6, wherein the processing module further obtains the formula through a least square method according the relative relationship.

8. The electronic device as claimed in claim 6, wherein the processing module further cuts the first image into multiple grids, and takes an intersection of every two grids as the feature points.

9. The electronic device as claimed in claim 8, wherein the processing module further cuts the first image into multiple grids according to radians corresponding to latitude and longitude.

10. The electronic device as claimed in claim 6, wherein the processing module further deletes the optical flow feature vectors smaller than an jitter threshold, divides a two-dimensional coordinate system into multiple sectors of the same size of area, adds up the optical flow feature vectors located in the same sector to obtain a total feature vector corresponding to each sector, and obtains the current humidity according to the total feature vector in a plurality of the sectors and the formula.

* * * * *